(12) United States Patent
Oswald et al.

(10) Patent No.: US 7,714,562 B2
(45) Date of Patent: May 11, 2010

(54) HYSTERETIC SWITCHING REGULATOR

(75) Inventors: Richard Oswald, San Jose, CA (US);
Tamotsu Yamamoto, Cupertino, CA
(US); Takashi Ryu, Kyoto (JP);
Hirohisa Tanabe, Kyoto (JP); Masaaki Koto, Osaka (JP)

(73) Assignee: Panasonic Corporation, Osaka (JP)

( * ) Notice: Subject to any disclaimer, the term of this patent is extended or adjusted under 35 U.S.C. 154(b) by 364 days.

(21) Appl. No.: 11/633,635

(22) Filed: Dec. 5, 2006

(65) Prior Publication Data
US 2007/0145965 A1 Jun. 28, 2007

Related U.S. Application Data

(60) Provisional application No. 60/741,896, filed on Dec. 5, 2005.

(51) Int. Cl.
*G05F 1/56* (2006.01)
(52) U.S. Cl. .................................. 323/288; 323/284
(58) Field of Classification Search ......... 323/284–286, 323/288
See application file for complete search history.

(56) References Cited

U.S. PATENT DOCUMENTS

| | | | |
|---|---|---|---|
| 4,378,530 A | 3/1983 | Garde | |
| 4,727,308 A | 2/1988 | Huljak et al. | |
| 4,943,902 A | 7/1990 | Severinsky | |
| 4,959,606 A | 9/1990 | Forge | |
| 5,305,192 A | 4/1994 | Bonte et al. | |
| 5,420,530 A | 5/1995 | Mita | |
| 5,420,532 A | 5/1995 | Teggatz et al. | |
| 5,479,090 A | 12/1995 | Schultz | |
| 5,600,234 A | 2/1997 | Hastings et al. | |

(Continued)

FOREIGN PATENT DOCUMENTS

WO    WO 03/047080 A1    6/2003

OTHER PUBLICATIONS

Castilla, M., Garcia de Vicuña, L., Guerrero, J. M., Matas, J., & Miret, J. (2005). Design of voltage-mode hysteretic controllers for synchronous buck converters supplying microprocessor loads. IEE Proceedings—Electric Power Applications, 152(5), 1171-1178. doi: 10.1049/ip-epa:20045276.*

(Continued)

*Primary Examiner*—Jeffrey L Sterrett
*Assistant Examiner*—Fred E Finch, III
(74) *Attorney, Agent, or Firm*—McDermott Will & Emery LLP

(57) ABSTRACT

A switching regulator circuit including a high-side switch and a low-side switch; an inductor having a first terminal coupled to a common terminal between the high-side switch and the low-side switch, and a second terminal coupled to an output terminal of the switching regulator circuit; a low-pass filter coupled to the first terminal of the inductor, where the low-pass filter is operative for generating a ramp signal based on the voltage signal present at the first terminal of the inductor; and a hysteretic comparator coupled to the low pass filter, where the hysteretic comparator receives the ramp signal as an input signal, and generates an output signal which is operative for controlling the operation of the high-side switch and the low-side switch.

19 Claims, 3 Drawing Sheets

U.S. PATENT DOCUMENTS

| | | | |
|---|---|---|---|
| 5,903,447 A | 5/1999 | Takahashi et al. | |
| 5,905,407 A | 5/1999 | Midya | |
| 5,929,620 A | 7/1999 | Dobkin et al. | |
| 5,949,229 A | 9/1999 | Choi et al. | |
| 5,982,160 A | 11/1999 | Walters et al. | |
| 5,991,182 A | 11/1999 | Novac et al. | |
| 6,034,517 A | 3/2000 | Schenkel | |
| 6,046,516 A | 4/2000 | Maier et al. | |
| 6,066,943 A | 5/2000 | Hastings et al. | |
| 6,147,478 A | 11/2000 | Skelton et al. | |
| 6,166,528 A | 12/2000 | Rossetti et al. | |
| 6,222,356 B1 | 4/2001 | Taghizadeh-Kaschani | |
| 6,268,756 B1 | 7/2001 | Nayebi et al. | |
| 6,304,066 B1 | 10/2001 | Wilcox et al. | |
| 6,307,356 B1 | 10/2001 | Dwelley | |
| 6,313,610 B1 | 11/2001 | Korsunsky | |
| 6,366,070 B1 | 4/2002 | Cooke et al. | |
| 6,396,250 B1 | 5/2002 | Bridge | |
| 6,404,261 B1 | 6/2002 | Grover et al. | |
| 6,476,589 B2 | 11/2002 | Umminger et al. | |
| 6,498,466 B1 | 12/2002 | Edwards | |
| 6,509,721 B1 | 1/2003 | Liebler | |
| 6,522,178 B2 | 2/2003 | Dubhashi et al. | |
| 6,541,947 B1 | 4/2003 | Dittmer et al. | |
| 6,563,725 B2 * | 5/2003 | Carsten | 363/127 |
| 6,583,610 B2 * | 6/2003 | Groom et al. | 323/288 |
| 6,611,131 B2 | 8/2003 | Edwards | |
| 6,724,174 B1 | 4/2004 | Esteves et al. | |
| 6,744,241 B2 | 6/2004 | Feldtkeller | |
| 6,828,766 B2 | 12/2004 | Corva et al. | |
| 6,873,140 B2 | 3/2005 | Saggini et al. | |
| 6,894,471 B2 | 5/2005 | Corva et al. | |
| 6,958,594 B2 * | 10/2005 | Redl et al. | 323/282 |
| 6,979,985 B2 | 12/2005 | Yoshida et al. | |
| 6,984,966 B2 * | 1/2006 | Kubota et al. | 323/282 |
| 7,019,504 B2 * | 3/2006 | Pullen et al. | 323/283 |
| 7,030,596 B1 | 4/2006 | Salemo et al. | |
| 7,091,711 B2 | 8/2006 | Yoshida et al. | |
| 7,109,693 B2 | 9/2006 | Yoshida et al. | |
| 2003/0025484 A1 | 2/2003 | Edwards | |
| 2005/0018458 A1 | 1/2005 | Shimada et al. | |
| 2007/0018617 A1 | 1/2007 | Endo | |

OTHER PUBLICATIONS

Philip T. Krein, "Geometric Control for Power Converters," Elements of Power Electronics, Oxford University Press, 1998, pp. 662-676.

Japanese Notice of Reasons for Rejections, w/ English translation thereof, issued in Japanese Patent Application No. JP 2006-327822 dated Nov. 10, 2009.

* cited by examiner

HYSTERETIC SWITCHING REGULATOR

CLAIM OF PRIORITY

This patent application, and any patent(s) issuing therefrom, claims priority to U.S. provisional patent application No. 60/741,896, filed on Dec. 5, 2005, which is incorporated herein by reference in its entirety.

FIELD OF THE INVENTION

The present invention relates to an improved hysteretic switching regulator, and more specifically, to a novel, cost effective design for a hysteretic switching regulator in which the control signal for controlling the switching function of the regulator is independent from variations regarding the operation of the device, such as variations in load current.

BACKGROUND OF THE INVENTION

It is well known that hysteretic controlled switching regulators offer many performance advantages as well as configuration simplifications, which include fast response times for both input set point changes and output load changes, and no need for control loop frequency compensation or slope compensation for stability. However, for proper operation, most hysteretic switching regulators require a fairly large and repeatable value of voltage ripple signal at the output load or a means of sensing the inductor current in order to generate a control ramp signal, which is required to be supplied to a hysteretic comparator contained within the regulator. FIG. 1a illustrates an example of a prior art hysteretic regulator. As explained in more detail below, in this circuit, the equivalent series resistance of the output capacitor is utilized to generate the control ramp signal which is supplied to the hysteresis comparator.

Specifically, in the regulator of FIG. 1a, the inherent triangular waveform of the inductor current $I_L$, flowing through the inductor 15 generated by the turning on and off of the high and low side switches 11, 12, which operate out of phase with one another, causes a ripple voltage (shown in FIG. 1b) to be developed across the equivalent series resistance (ESR) of the output capacitor C, 13. This ripple voltage is applied to the hysteresis comparator 16, causing the comparator 16 to turn on and off, thereby creating the switching control signal, which is coupled to high and low side switches 11, 12. As can be seen, the configuration of the switching regulator shown in FIG. 1a requires a ripple voltage to appear on the output load 17, which is clearly undesirable and cannot be tolerated in the supply voltage of many systems.

Another problem with the switching regulator of FIG. 1a is that it is difficult to specify or even accurately predict the value of the equivalent series resistor (ESR) in the tantalum capacitors suitable for use in switching regulators. It is noted that ceramic dielectric capacitors have too small a value of ESR to be utilized, as the resulting ripple signal is too small. As a result, in such devices, a small value discrete resistor must usually be added in series with the output capacitor to have this configuration work successfully. The use of such discrete components, which are costly, is undesirable for various reasons.

FIGS. 2a and 2b illustrate additional prior art hysteretic switching regulators which attempt to solve some of the shortcomings of the switching regulator shown in FIG. 1a. Referring to FIG. 2a, in this configuration, a current sense resistor 19 is placed ahead of the load capacitor 13. In operation, the inductor current $I_L$ flowing through the small value current sense resistor $R_S$ 19 produces the required ramp control signal, which is coupled to the input of the hysteresis comparator 16. However, due to the current sense resistor 19, the DC voltage at the load 17 does not equal the DC voltage at the sampling point for generating the control signal, and therefore an error is introduced into the control signal, which causes an error in the regulated output voltage, $V_{OUT}$. This error can be minimized by utilizing AC coupling and including an additional capacitor $C_c$ 21 and resistor 22 in the circuit shown in FIG. 2a, as shown in FIG. 2b, which eliminates the DC component in $V_{OUT}$ due to $R_s$. However, such a configuration degrades the transient response of the switching regulator. Since the rate of change of current through an inductor is proportional to the voltage across it, $$\frac{dI_L}{dt} = \frac{V_L}{L},$$

a measure of inductor current $I_L$ can be obtained by integrating the inductor voltage:

$$I_L = \frac{1}{L} \int V_L(t) dt.$$

This is typically done with an R-C low pass filter approximation to an integrator as shown in FIG. 3, which illustrates yet another prior art configuration of a hysteretic switching regulator.

In the switching regulator shown in FIG. 3, the $R_I$—$C_I$ network 25 implements a low pass filter that effectively integrates the inductor voltage to obtain an inductor current signal that can be used for the ramp control signal, which is coupled to the hysteresis comparator 16. In addition, $C_C$ 21 and resistor 22 can be added as in the device of FIG. 2b to reduce the effect of the inherent series resistance of the inductor ($r_L$) on $V_{OUT}$, but it cannot be eliminated from the integration. While the configuration illustrated in FIG. 3 helps reduce the error in $V_{OUT}$ associated with the series resistance, Rs, in the switching regulator configuration of FIG. 2, as more components are required, including energy storage elements (i.e., inductors and capacitors), the switching regulator of FIG. 3 exhibits a poor transient response and becomes prohibitively costly, because the required component values cannot be easily implemented within an integrated circuit.

Another problem with all of the foregoing prior switching regulator circuits, which utilize inductor current to generate the triangular control signal for the comparator, is that the amplitude of the triangular signal varies with the magnitude of the load current and this causes changes in the regulator switching frequency which may be unacceptably large when the inductor and load current vary over a wide range. Other types of output filters have been proposed for generating the triangular control signal from the load voltage and inductor current, but they all have similar limitations as described above, as well as requiring several physically large R and C components that are not feasibly implemented in an integrated circuit.

SUMMARY OF THE INVENTION

In view of the foregoing, it is a primary objective of the present invention to provide a switching regulator that eliminates the problems associated with prior art devices as discussed above. More specifically, one objective is to provide a switching regulator which generates the control signal without utilizing a resistor to sense the inductor current and who's amplitude is independent of the magnitude of the load current. By achieving the foregoing objective, it is possible to produce a hysteretic switching regulator that overcomes the problems noted above with the prior art devices.

According to one embodiment, the present invention relates to a switching regulator circuit including a high-side switch and a low-side switch; an inductor having a first terminal coupled to a common terminal between the high-side switch and the low-side switch, and a second terminal coupled to an output terminal of the switching regulator circuit; a low-pass filter coupled to the first terminal of the inductor, which is operative for generating a ramp signal based on the voltage signal present at the first terminal of the inductor; and a hysteretic comparator coupled to the low pass filter, which receives the ramp signal as an input signal, and generates an output signal operative for controlling the operation of the high-side switch and the low-side switch.

The hysteretic switching regulator of the present invention provides numerous advantages over the prior art. One advantage is that because the control signal is generated so as to be substantially independent of the magnitude of the load current, the switching frequency of the regulator does not significantly vary in accordance with changes in load current. Another advantage associated with the present invention is that it exhibits improved response times when there are changes in the load or changes in the set point reference voltage. Yet another advantage of the present invention is that it minimizes switching losses and improves efficiency, especially at small load currents. One other advantage is that determining the best choice of values for the components of the device of the present invention is easier and requires fewer compromises due to less interaction between component values.

Additional objects, advantages, and novel features of the invention will become apparent to those skilled in the art upon examination of the following description, or may be learned by practice of the invention. While the novel features of the invention are set forth below, the invention, both as to organization and content, will be better understood and appreciated, along with other objects and features thereof, from the following detailed description taken in conjunction with the drawings.

BRIEF DESCRIPTION OF THE DRAWINGS

The accompanying drawings, which are incorporated into and form a part of the specification, illustrate several aspects and embodiments of the present invention and, together with the general description given above and detailed description given below, serve to explain the principles of the invention. Such description makes reference to the annexed drawings. The drawings are only for the purpose of illustrating preferred embodiments of the invention and are not to be treated as limiting the invention.

FIG. 1b illustrates the approximately triangular waveform of ripple present at the output of the regulator of FIG. 1a.

Throughout the above-mentioned drawings, identical reference numerals are used to designate the same or similar component parts.

DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein: rather, these embodiments are provided so that this disclosure will be thorough and complete, and will fully convey the scope of the invention to those skilled in the art; like numbers refer to like elements throughout.

Figure 4:
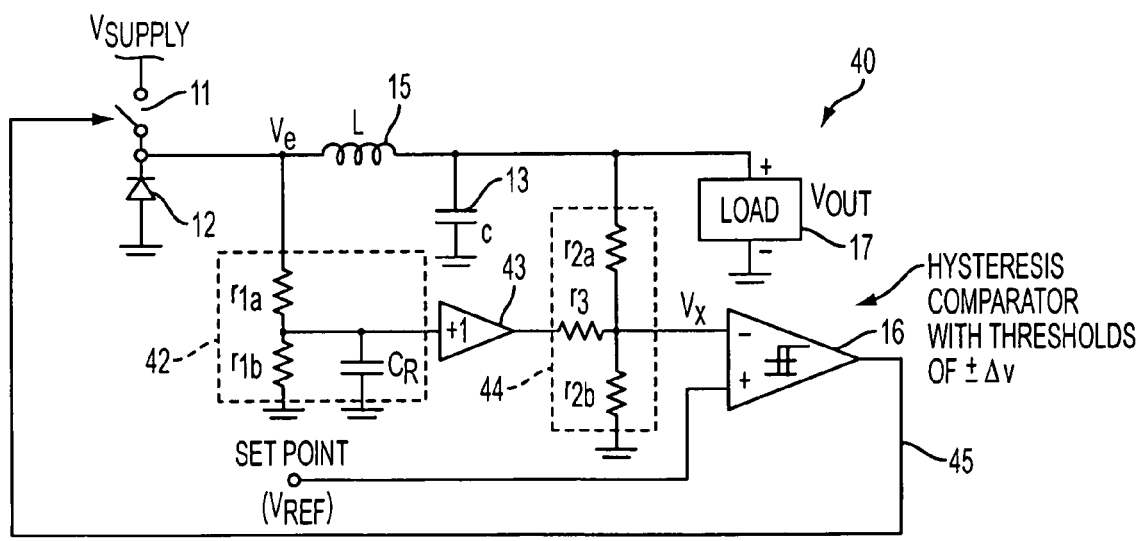
FIG. 4 illustrates a first exemplary embodiment of the hysteretic switching regulator of the present invention.

FIG. 4 illustrates an exemplary embodiment of a hysteretic switching regulator in accordance with the present invention. Referring to FIG. 4, the hysteretic switching regulator 40 includes a high-side switch 11 and a low-side switch 12 (which in the given embodiment is implemented by a diode, preferably an active diode, such as disclosed in U.S. patent application Ser. No. 11/094,369 filed on Mar. 31, 2005, which is hereby incorporated by reference in its entirety), an inductor L 15 and a capacitor C 13 which is coupled to the load 17. The hysteretic switching regulator 40 further includes a low-pass filter 42 formed, for example, by resistors $r_{1a}$, $r_{1b}$ and capacitor $C_R$, which is coupled to the input of the inductor L 15; a buffer 43 coupled to the output of the low-pass filter 42; a damping/sampling circuit 44 formed, for example, by resistors $r_{2a}$, $r_{2b}$ and $r_3$ which receives the output of the buffer 43 as an input signal, and a hysteresis comparator 16, which receives the output of the damping/sampling circuit 44 as an input signal. The output of the hysteretic comparator 16 is coupled to the high-side switch 11, and functions to control the high-side switch 11.

Figure 6:
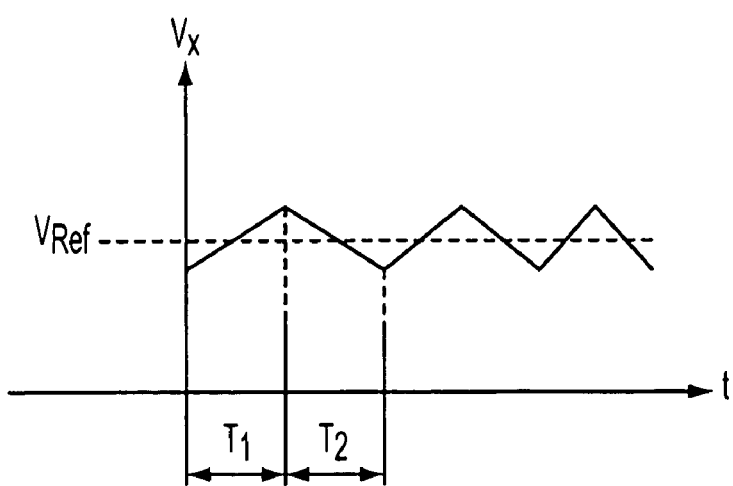
FIG. 6 illustrates an exemplary comparator input signal generated by the hysteretic switching regulator of FIG. 4.

With regard to the operation of the hysteretic switching regulator 40, in the given embodiment, an approximately triangular control signal Vx (such as illustrated in FIG. 6), is generated in-part by the low-pass filter 42, which receives and is driven by the square wave signal, Ve, at the output of the supply voltage switch 11 (i.e., the high-side switch), and is applied to the hysteretic comparator to produce the power switch drive signal 45. As the voltage drops caused by the load current flowing through the inherent series resistance of inductor L 15 and the forward drop of the low side switch 12 are small (especially if the low side switch is implemented utilizing an "active diode"), the voltage across the capacitor $C_R$ contained in the low-pass filter 42, is approximately:

$$V_{CR} = \frac{K_1 V_{OUT}}{s\tau + 1}, \text{ where } \tau = \frac{r_{1a} r_{1b}}{r_{1a} + r_{1ba}} C_r \text{ and } K_1 = \frac{r_{1b}}{r_{1a} + r_{1b}},$$

where s is the frequency related variable in the LaPlace transform representation of a transfer function. The voltage, $V_X$, at the output of the damping/sampling circuit 44 and input to the hysteretic comparator 16 is:

$$V_X = V_{CR} \frac{r_2}{(r_2 + r_3)} + V_{OUT} K_2 \frac{r_3}{(r_2 + r_3)},$$

where $$r_2 = \frac{r_{2a} r_{2b}}{r_{2a} + r_{2b}} \text{ and } K_2 = \frac{r_{2b}}{r_{2a} + r_{2b}}.$$

In normal operation of the regulator of FIG. 4, the time constant τ is chosen to be much larger than the period of the nominal switching frequency so that $V_{CR}$ is nearly triangular rather than exponential, and $V_{OUT}$ is almost pure DC with negligible ripple voltage and $K_1=K_2=K$. Thus, voltage $V_X$, at the input of the hysteretic comparator 16, is triangular with average value $V_{REF}$, with its positive slope defined by:

$$\frac{(K*V_{supply} - V_{REF})r_2}{\tau(r_2 + r_3)},$$

and its negative slope defined by:

$$\frac{V_{REF} r_2}{\tau(r_2 + r_3)}.$$

Thus, the time for the positive slope period of the voltage at $V_X$ is $$T_1 = \frac{2\Delta_v \tau(r_2 + r_3)}{(K*V_{supply} - V_{REF})r_2},$$

the negative slope period $$T_2 = \frac{2\Delta_v \tau(r_2 + r_3)}{V_{REF} r_2},$$

and the switching frequency equals:

$$f_s = \frac{1}{T_1 + T_2} = \frac{1}{2\Delta_v \tau} \frac{(K*V_{supply} - V_{REF})*V_{REF} r_2}{K*V_{supply}(r_2 + r_3)}.$$

FIG. 6 illustrates an example of the signal, $V_x$, present at the input of the hysteretic comparator 16.

Accordingly, as is seen from the foregoing equations, the switching frequency of the hysteretic switching regulator 40 varies with $V_{supply}$ and $V_{REF}$ and is a function of fixed parameters K, τ, $r_2$, $r_3$ and Δv, but, importantly, is independent of the load current.

It is noted that the value of K sets the output voltage:

$$V_{OUT} = \frac{V_{REF}}{K}.$$

Usual values for the other parameters are:

$$r_2 \cong r_3, \Delta v \cong \frac{V_{REF}}{100} \text{ (typically)},$$

and τ is chosen to give the desired switching frequency $f_s$ for typical values of $V_{supply}$ and $V_{REF}$. The foregoing circuit configuration and parameter values provide for excellent response to changes in load (since there is no low pass filter between the load and the comparator input) and $V_{OUT}$ follows changes in set point $V_{REF}$ within the response time set by τ.

As is clear from the foregoing, in the hysteretic switching regulator of the present invention, the control signal 45 output by the comparator 16 is generated without utilizing a resistor to sense current and is nearly independent of the load current. As explained above, the control signal 45 is generated based on the voltage signal present at the input of the inductor L 15, which is coupled to the low-pass filter 42, which in the given embodiment is formed by components $r_{1a}$, $r_{1b}$ and $C_R$. The AC component of the output of the low-pass filter 42 is a triangular ramp signal. As also indicated above, the R-C time constant of the low-pass filter 42 should be sufficiently longer than the desired switching frequency period such that the substantially linear portion of the exponential response of the low-pass filter 42 is utilized to generate the ramp signal. Furthermore, resistors $r_{1a}$ and $r_{1b}$ of low-pass filter 42 also function to reduce the peak-to-peak voltage level of the ramp signal, thereby allowing for a reduction in the voltage swing that the buffer 43 and hysteretic comparator 16 must be able to accommodate.

It is noted that the buffer 43 functions to prevent the output of the switching regulator 40 from interacting with or loading the capacitor, $C_R$, of the low-pass filter 42, and generally isolates the low-pass filter 42 from the output of the switching regulator 40. This is important, as for example, it allows for a small value capacitor to be utilized for $C_R$.

As also noted above, resistors $r_{2a}$, $r_{2b}$ and $r_3$ form the damping circuit 44, which functions to sample the output voltage and adjust the value of the ramp signal output by the buffer 43 prior to the ramp signal being input into the hysteresis comparator 16. The values of resistor $r_{2a}$, $r_{2b}$ and $r_3$ are selected such that the damping (or feedback) functions to control load transients, but not to affect the shape of the desired ramp control signal. This damping circuit 44 is especially necessary when the output of the switching regulator is coupled to a linear regulator which is essentially a current sink (as opposed to a resistive load).

Figure 5:
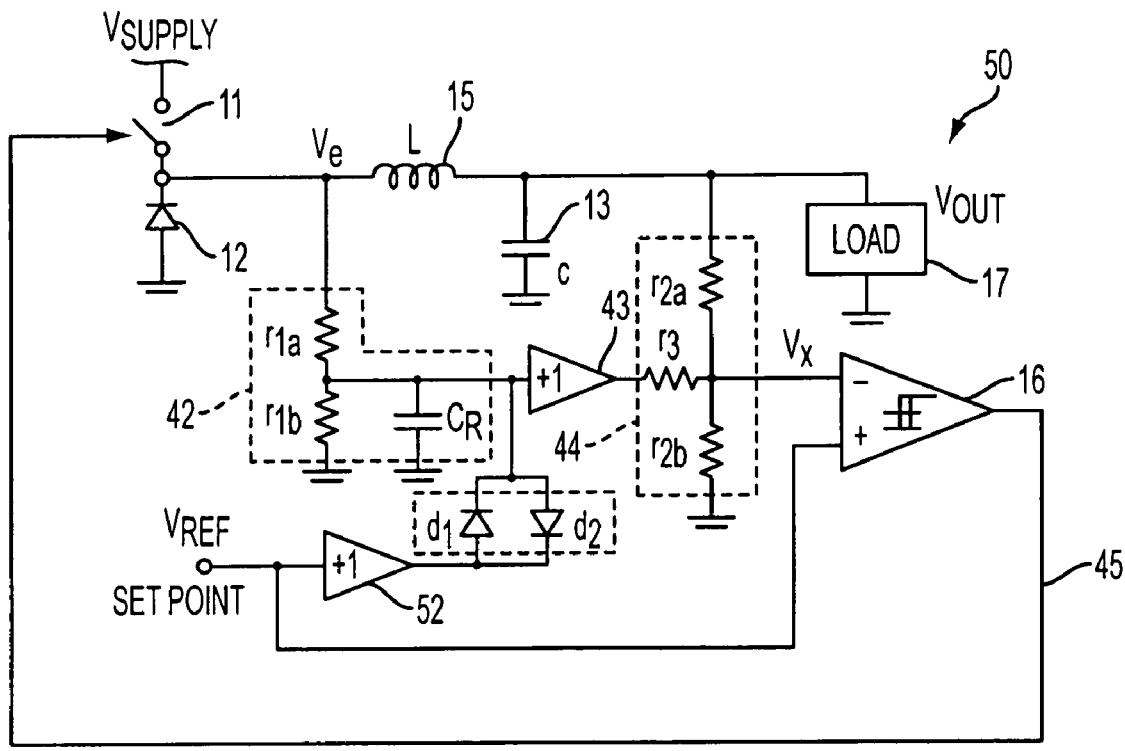
FIG. 5 illustrates a second exemplary embodiment of the hysteretic switching regulator of the present invention.

Thus, as indicated by the equations above, the ramp signal coupled to the input of the hysteretic comparator 16 comprises the combination of the triangular ramp signal output by the buffer and a portion of the sampled output voltage adjusted based on the values of resistor $r_{2a}$, $r_{2b}$ and $r_3$ of the damping circuit 44. It is also noted that, the phases of voltage signal output by the buffer 43 and the sampled output signal obtained from the damping circuit 44 are substantially in quadrature with one another (as explained below, the embodiment of FIG. 5 provides for improved performance during transients). Thus, the ripple voltage from $V_{OUT}$ is at its zero value when the voltage signal from the buffer 43 is at its positive or negative peaks where the comparator 16 switches states, and the magnitude of the $V_{OUT}$ ripple does not affect the switching points.

FIG. 5 illustrates a second embodiment of the present invention which allows for the output load voltage to more accurately track rapid changes in the set point (as will occur when the set point is programmable). As shown in FIG. 5, the hysteretic switching regulator of the second embodiment 50 is the same as shown in FIG. 4 with the exception that the circuit 50 includes an additional buffer 52 having an input which receives $V_{REF}$, and two additional components $d_1$ and $d_2$, which are preferably active devices (similar to the active device utilized for the low-side switch as detailed above). As shown, the additional buffer 52 receives the $V_{REF}$ set point signal as an input signal, and the output of the buffer 52 is coupled to the input of buffer 43 via components $d_1$ and $d_2$, which are coupled in parallel with one another. It is noted that the direction (i.e., location of cathode and anode terminal) of the diodes $d_1$ and $d_2$ are opposite one another in the configuration as shown in FIG. 5.

In the switching regulator shown in FIG. 5, components $d_1$ and $d_2$ provide the functions of diodes but are usually implemented utilizing active circuits so as to have stable forward voltage drops, which are chosen to be only slightly larger than $\Delta v^*(r_2+r_3)/r_2$. In normal steady state operation, the components $d_1$ and $d_2$ are off and do not affect the amplitude of the triangular voltage on $C_R$. However, if the set point $V_{REF}$ changes (in either the positive or negative direction), one of the components $d_1$ and $d_2$ will conduct, and cause the average value of $V_{CR}$ to more closely follow $V_{REF}$. Once the switching regulator reaches steady state again, both components $d_1$ and $d_2$ are again off, and $V_{REF}$ is no longer directly connected to the input of the buffer 43 coupled to the output of the low-pass filter 42. As a result of this configuration, the slew rate of $V_{OUT}$ is limited only by the values of L and C and not significantly affected by the value of τ. Thus, the embodiment of the invention illustrated in FIG. 5 provides both the advantage of the switching control signal being independent of the load current and improved response times to changes in the desired output voltage.

Figure 1B:
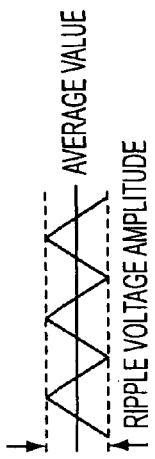
Figure 1A:
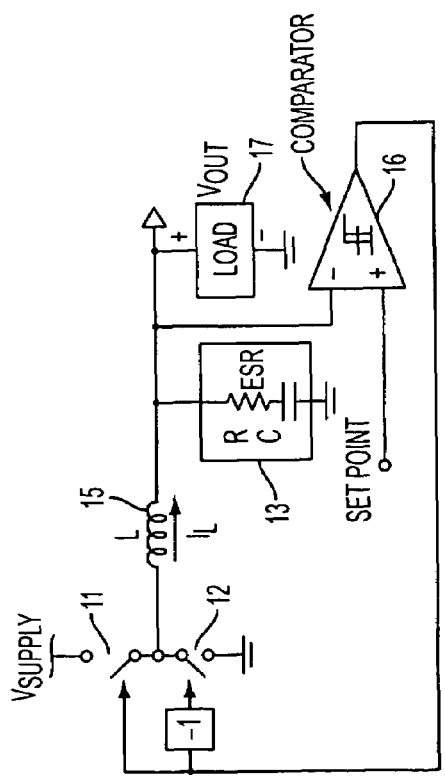
FIG. 1a illustrates an example of a prior art hysteretic switching regulator.

In addition to those already noted above, there are additional advantages associated with the hysteretic switching regulator of the present invention. For example, the switching regulator greatly improves efficiency at small load currents. More specifically, in the prior art configurations, as shown in FIGS. 1-3, the low-side switch 12 coupled to an input node of the inductor 15 and to ground is driven by the comparator signal with a phase opposite to that driving the high-side switch 11. This causes the regulator to operate in "forced continuous (inductor) current" mode, in which case the direction of the inductor current, $I_L$, is allowed to reverse when the load current is small. In this case, the peak-to-peak value and switching frequency of the inductor current dependant input signal to the comparator 16 are always maintained nearly constant by allowing the minimum value of inductor current to be negative when its average value (which is equal to that of the load current) is small and even zero. This allows the switching frequency to remain nearly constant as the load current becomes small, but at the cost of a drastic reduction in efficiency caused by the large value of instantaneous inductor current and switching losses in the regulator components even though the load current is small.

Figure 2B:
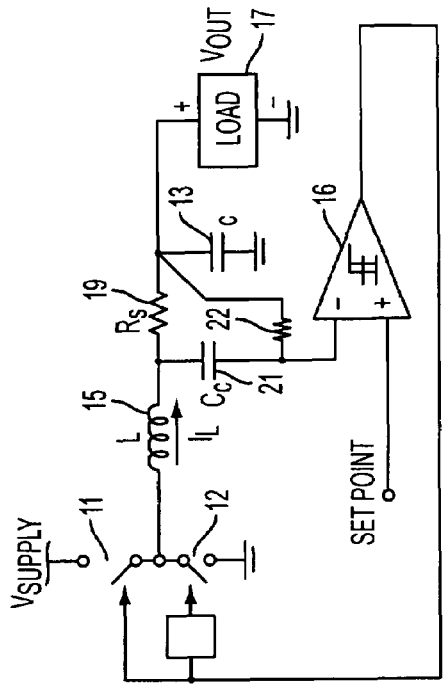
FIGS. 2a and 2b illustrate additional examples of prior art hysteretic switching regulators.
Figure 2A:
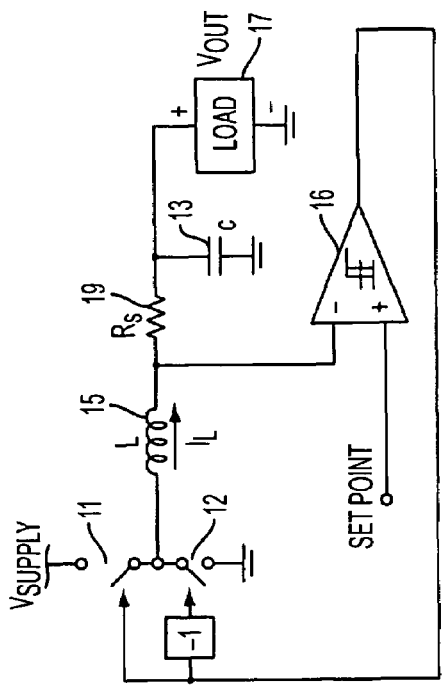
Figure 3:
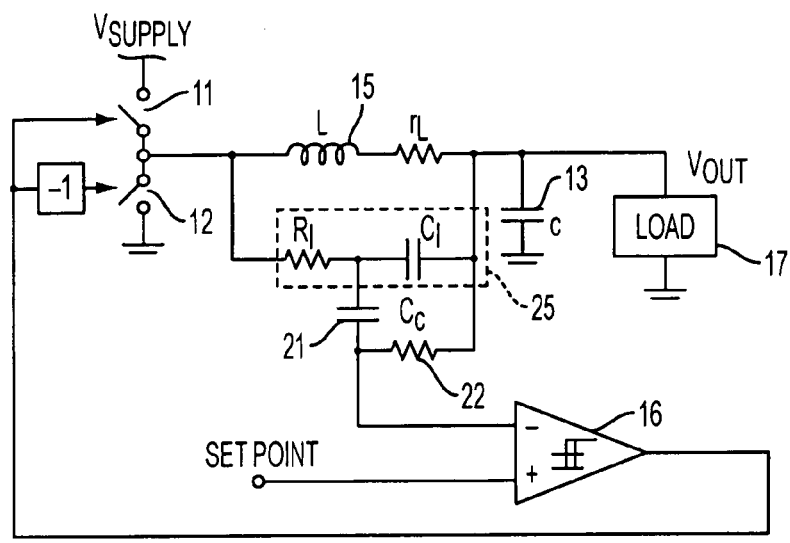
FIG. 3 illustrates another example of a prior art hysteretic switching regulator that does not require a current sense resistor.

Further, if the low-side switch of the prior art configuration is replaced by a diode in an attempt to get the low load current efficiencies of the present invention as shown in FIGS. 4 and 5, the AC coupling capacitor, Cc, of FIGS. 2b and 3 degrades both the steady state and transient response of the prior art regulators. Moreover, any configuration that introduces a low pass filter between the output voltage at the load and the comparator will always have slower response to load changes.

However, in the switching regulator of the present invention, as is shown for example in FIGS. 4 and 5, the switching control signal is generated primarily by the low-pass filter 42 driven by the square wave signal at the output of the high-side switch 11, and the amplitude of this signal is not directly related to the amplitude of the inductor current as is the case for the control signal in the prior art configurations. This makes the switching frequency independent of the load current as long as the inductor current remains continuous, but when its minimum value would become negative as it does in the prior art configurations with a controller driven low side switch, in the present invention utilizing the low-side diode 12, the inductor current becomes zero. The inductor current remains zero until a decrease in output voltage, rather than low-pass filter voltage, causes the control voltage to become less than the lower threshold of the hysteresis comparator 16, at which time the high-side switch 11 turns on again. Thus, in the present invention, at low currents the controller circuit configuration allows the switching frequency to decrease and the inductor peak current to become much smaller in magnitude (i.e., the present invention allows for operation in a discontinuous inductor current mode). This in turn reduces both switching and conduction losses, and increases efficiency.

While specific embodiments of, and examples for, the invention are described herein for illustrative purposes, various equivalent modifications are possible within the scope of the invention, as those skilled in the relevant art will recognize.

It is intended that all matter contained in the above description and shown in the accompanying drawings shall be interpreted as illustrative and not in a limiting sense. It is also to be understood that the following claims are intended to cover all generic and specific features herein described and all statements of the scope of the various inventive concepts which, as a matter of language, might be said to fall there-between.

What is claimed is:

1. A switching regulator circuit comprising:

a high-side switch and a low-side switch coupled in a series configuration;

an inductor having a first terminal coupled to a common terminal between said high-side switch and said low-side switch; and a second terminal coupled to an output terminal of said switching regulator circuit;

a low-pass filter coupled to said first terminal of said inductor, said low-pass filter generating a ramp signal based on the voltage signal present at said first terminal of said inductor;

a buffer having an input terminal coupled to an output terminal of said low-pass filter, and said buffer circuit isolates said low-pass filter from said output terminal of said switching regulator circuit; and a hysteretic comparator coupled to said low pass filter via said buffer circuit, said hysteretic comparator receiving said ramp signal as an input signal, and generating an output signal which controls the operation of said high-side switch and said low-side switch; and a damping circuit having an input terminal coupled to an output terminal of said buffer circuit and an output terminal coupled to an input terminal of said hysteretic comparator, said damping circuit sampling an output voltage at said output terminal of the switching regulator circuit and adjusting the level of said ramp signal input into said hysteretic comparator said damping circuit comprising:

a resistor coupled between an output of the buffer circuit and an input of the hysteretic comparator; and a resistor network coupled to said output terminal of switching regulator circuit, said resistor network configured as a voltage divider so as to feedback a reduced value of the output voltage to the input of said hysteretic comparator.

2. The switching regulator circuit of claim 1, wherein an amplitude of said ramp signal does not directly fluctuate with variations in the amount of current drawn by a load coupled to the switching regulator circuit.

3. The switching regulator circuit of claim 1, wherein said low pass filter comprises a first resistor and a second resistor coupled in a series configuration and a capacitor coupled in parallel with said second resistor, said first resistor being coupled to said first terminal of said inductor and a first terminal of said second resistor.

4. The switching regulator circuit of claim 1, wherein said ramp signal is a triangular wave.

5. The switching regulator circuit of claim 1, wherein said low-side switch comprises an active diode.

6. The switching regulator circuit of claim 1, further comprising a resistive component coupled between an output terminal of said buffer circuit and an input terminal of said hysteretic comparator.

7. The switching regulator circuit of claim 6, wherein said resistive component is coupled in a series configuration between the output terminal of said buffer circuit and said input terminal of said hysteretic comparator.

8. The switching regulator circuit of claim 1, wherein said hysteretic comparator receives a reference voltage as a second input signal.

9. A switching regulator circuit comprising:
a high-side switch and a low-side switch coupled in a series configuration;
an inductor having a first terminal coupled to a common terminal between said high-side switch and said low-side switch; and a second terminal coupled to an output terminal of said switching regulator circuit;
a low-pass filter coupled to said first terminal of said inductor, said low-pass filter generating a ramp signal based on the voltage signal present at said first terminal of said inductor;
a first buffer circuit having an input terminal coupled to an output terminal of said low-pass filter, said first buffer circuit isolates said low-pass filter from said output terminal of said switching regulator circuit;
a damping circuit having a first input terminal coupled to an output terminal of said first buffer circuit, a second input terminal coupled to said output terminal of said switching regulator, and an output terminal;
a hysteretic comparator coupled to said output terminal of said damping circuit, said hysteretic comparator receiving said ramp signal as an input signal, and generating an output signal which controls the operation of said high-side switch and said low-side switch;
a second buffer circuit which receives a reference voltage signal as an input signal, and
a switching network coupled to an output of said second buffer, said switching network coupling said output of said second buffer to said input of said first buffer if there is a change in the reference voltage signal,
wherein said damping circuit comprises:
a resistor coupled between an output of the buffer circuit and an input of the hysteristic comparator; and
a resistor network coupled to said output terminal of switching regulator circuit, said resistor network configured as a voltage divider so as to feedback a reduced value of the output voltage to the input of said hysteretic comparator.

10. The switching regulator circuit of claim 9, wherein said switching network comprises a first diode and a second diode coupled in parallel with one another, said first diode and said second diode capable of conducting current in opposite directions within the switching network.

11. The switching regulator circuit of claim 10, wherein each of said first diode and said second diode are formed utilizing active diodes.

12. The switching regulator circuit of claim 9, wherein an amplitude of said ramp signal does not directly fluctuate with variations in the amount of current drawn by a load coupled to the switching regulator circuit.

13. The switching regulator circuit of claim 9, wherein said damping circuit samples an output voltage at said output terminal of said switching regulator circuit and adjusts the level of said ramp signal input into said hysteretic comparator.

14. The switching regulator circuit of claim 9, wherein said low pass filter comprises a first resistor and a second resistor coupled in a series configuration and a capacitor coupled in parallel with said second resistor, said first resistor being coupled to said first terminal of said inductor and a first terminal of said second resistor.

15. The switching regulator circuit of claim 9, wherein said ramp signal is a triangular wave.

16. The switching regulator circuit of claim 9, wherein said low-side switch comprises an active diode.

17. The switching regulator circuit of claim 9, wherein said damping circuit further comprising a resistive component coupled between the output terminal of said first buffer circuit and an input terminal of said hysteretic comparator.

18. The switching regulator circuit of claim 17, wherein said resistive component is coupled in a series configuration between the output terminal of said first buffer circuit and said input terminal of said hysteretic comparator.

19. The switching regulator circuit of claim 9, wherein said hysteretic comparator receives a reference voltage as a second input signal.

* * * * *